United States Patent
Wang et al.

(10) Patent No.: US 9,246,565 B2
(45) Date of Patent: Jan. 26, 2016

(54) USER EQUIPMENT, BASE STATION AND METHOD FOR SELECTING REMOTE RADIO HEAD

(71) Applicant: FUJITSU LIMITED, Kawasaki-shi, Kanagawa (JP)

(72) Inventors: Yi Wang, Beijing (CN); Yuantao Zhang, Beijing (CN); Hua Zhou, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/071,174

(22) Filed: Nov. 4, 2013

(65) Prior Publication Data

US 2014/0064394 A1 Mar. 6, 2014

Related U.S. Application Data

(63) Continuation of application No. PCT/CN2011/073778, filed on May 6, 2011.

(51) Int. Cl.
*H04B 7/02* (2006.01)
*H04L 1/02* (2006.01)
(Continued)

(52) U.S. Cl.
CPC ............ *H04B 7/0473* (2013.01); *H04B 7/0456* (2013.01); *H04B 7/0639* (2013.01); *H04B 7/0691* (2013.01)

(58) Field of Classification Search
CPC .. H04B 7/0456; H04B 7/0473; H04B 7/0639; H04B 7/0691; H04B 7/0417; H04B 7/0669; H04L 1/0618; H04L 1/06; H04L 25/0204
USPC ........................................................ 375/267
See application file for complete search history.

(56) References Cited

U.S. PATENT DOCUMENTS 3,541,446 A * 11/1970 Prozeller ..................... 324/99 D
6,922,445 B1    7/2005 Sampath et al.
(Continued)

FOREIGN PATENT DOCUMENTS

CN    101399722    4/2009
CN    101582712    11/2009
(Continued)

OTHER PUBLICATIONS

Li, Pei-Rong ; Chang, Tain-Sao ; Feng, Kai-Ten; "Energy-efficient power allocation for distributed large-scale MIMO cloud radio access networks," 2014 IEEE Wireless Communications and Networking Conference (WCNC), 2014, pp. 1856-1861.*

(Continued)

*Primary Examiner* — Nader Bolourchi
(74) *Attorney, Agent, or Firm* — Myers Wolin, LLC

(57) ABSTRACT

The present invention relates to a User Equipment (UE), a base station and a method for selecting a Remote Radio Head (RRH). A UE, including: a storage unit configured to store a code book including a plurality of precoding matrixes which contain a precoding matrix having an element zero corresponding to an antenna; a precoding matrix selection unit configured to select the precoding matrix to be used according to the code book stored in the storage unit; and a report unit configured to report an index of the precoding matrix selected by the precoding matrix selection unit. In the preferred embodiments, elements of a same precoding matrix for antennas of same RRH are all zero or non-zero.

10 Claims, 10 Drawing Sheets

(51) Int. Cl.
*H04B 7/04* (2006.01)
*H04B 7/06* (2006.01)

(56) References Cited

U.S. PATENT DOCUMENTS

| | | | |
|---|---|---|---|
| 8,792,896 B2* | 7/2014 | Ahmad et al. | 455/438 |
| 2009/0238298 A1 | 9/2009 | Kim et al. | |
| 2010/0039928 A1* | 2/2010 | Noh et al. | 370/210 |
| 2010/0069122 A1* | 3/2010 | Ito | 455/562.1 |
| 2011/0064035 A1 | 3/2011 | Guerreiro et al. | |
| 2013/0003788 A1* | 1/2013 | Marinier et al. | 375/219 |
| 2013/0083864 A1* | 4/2013 | Moulsley | 375/267 |
| 2014/0029689 A1* | 1/2014 | Liu et al. | 375/267 |

FOREIGN PATENT DOCUMENTS

| | | |
|---|---|---|
| CN | 101582712 A | 11/2009 |
| JP | 2010-68496 A | 3/2010 |
| KR | 10-2009-0101759 A | 9/2009 |

OTHER PUBLICATIONS

R1-112582, "Considerations on RRH subset selection mechanism," Potevio, 3GPP TSG RAN WG1 Meeting #66, Athens, Greece, Aug. 22-26, 2011.*
PCT/CN2011/073778 International Preliminary Report on Patentability, Feb. 23, 2012.*
Extended European Search Report with Supplementary European Search Report and the European Search Opinion issued for corresponding European Patent Application No. 11865055.5, dated on Sep. 24, 2014.
Notice of Preliminary Rejection issued for corresponding Korean Patent Application No. 10-2013-7032312 mailed on Nov. 27, 2014 with an English translation.
Notice of Reason for Rejection issued for corresponding Japanese Patent Application No. 2014-509581, mailed on Feb. 3, 2015, with an English translation.
Office Action issued for corresponding Chinese Patent Application No. 201180062137.4 issued Apr. 29, 2015 with an English translation.

* cited by examiner

USER EQUIPMENT, BASE STATION AND METHOD FOR SELECTING REMOTE RADIO HEAD

CROSS-REFERENCE TO RELATED APPLICATIONS

The present application is a continuation of International Application No. PCT/CN2011/073778, filed on May 6, 2011, now pending, the contents of which are herein wholly incorporated herein by reference.

TECHNICAL FIELD

The present invention relates to the field of wireless communication, and particularly, to a wireless communication system having a Remote Radio Head (RRH).

BACKGROUND

The Long-term Evolution-Advanced (LTE-A) heterogeneous network system includes a macro cell, a femto cell, a pico cell, an RRH and a relay. In which, the RRH has no signal processing capacity. Instead, the RRH forwards signals based on a base station, and transmits the signals of the base station indistinguishably in the form of radio wave with a transmitting power less than that of the base station.

FIG. 1 is a schematic diagram of the distribution of a base station and RRHs. As illustrated in FIG. 1, the base station is located at the center of a cell, and seven RRHs are provided in the coverage range of the base station, wherein the RRHs are uniformly distributed at edge positions of the cell, directly connected to the base station through optical cables and capable of forwarding signals transmitted by the base station. In conventional techniques, generally the base station determines a RRH used to serve the User Equipment (UE) according to the positions of the UE and the RRHs, and notifies the UE of an antenna to be measured. In such technique, since the antennas of the base station can be distributed on a plurality of RRHs, the number of antennas used by the base station and the number of antennas to be measured can be both reduced. When receiving signals from the base station and the RRH, or signals from a plurality of RRHs, the UE merges the received signals, which is corresponding to a macro diversity. By merging the signals, the signal strength at the client-side is enhanced and the system performance is improved.

But in the process of implementing the present invention, the inventor finds that the above technique has the following problem: when the UE is served by a plurality of devices (RRHs or base stations, hereinafter referred to as Service Equipments (SEs)), sometimes certain SEs have very low signal powers at the UE, and sometimes certain SEs have far lower signal powers than other SEs. The signals of the SEs of very low or far lower powers have no benefit in improving the reception performance of the UE, and even cause interferences and degrade the performance, while certain power shall be consumed when the RRH transmits the signals of the UE.

Meanwhile, when the UE is located at the edge of the RRH, in order to realize the selection of the RRH, the UE usually needs to measure the signal powers of respective RRHs. Sometimes the respective RRHs and the base station belong to the same cell, and the traditional mode that measures the Reference Signal Received Power (RSRP) based on Cell-specific Reference signal (CRS) cannot work under such scenario, thus a mode capable of distinguishing the respective RRHs is required to assist the base station to realize the selection of the RRH.

To be noted, the above introduction to the technical background is just made for the convenience of clearly and completely describing the technical solutions of the present invention, and to facilitate the understanding of a person skilled in the art. It shall not be deemed that the above technical solutions are known to a person skilled in the art just because they have been illustrated in the Background section of the present invention.

SUMMARY

The present invention is proposed with respect to the above condition of the prior art, so as to overcome or relieve one or more shortages caused by the limitations or shortages of the prior art, and provide at least one beneficial selection.

According to one aspect of the present invention, a User Equipment (UE) is provided, including:
a storage unit, configured to store a code book including a plurality of precoding matrixes which contain a precoding matrix having an element zero corresponding to an antenna;
a precoding matrix selection unit, configured to select a precoding matrix to be used according to the code book stored in the storage unit; and
a report unit, configured to report an index of the precoding matrix selected by the precoding matrix selection unit.

According to another aspect of the present invention, a base station is provided, including:
a storage unit, configured to store a code book including a precoding matrix having an element zero corresponding to an antenna;
a precoding matrix index reception unit, configured to receive a precoding matrix index from a UE;
an element zero judgment unit, configured to search a precoding matrix corresponding to the precoding matrix index from the code book, so as to judge whether or not there is an element zero corresponding to the antenna in the precoding matrix; and
an antenna or RRH deactivation judgment unit, configured to judge whether or not there is an antenna or RRH that shall be deactivated for the UE according to a judgment result of the element zero judgment unit.

According to another aspect of the present invention, a method for selecting an RRH for a UE is provided, including: selecting a precoding matrix to be used according to a code book stored in a storage unit, the code book including a plurality of precoding matrixes which contain a precoding matrix having an element zero corresponding to an antenna; and reporting an index of the precoding matrix selected.

According to another aspect of the present invention, a method for selecting an RRH for a base station is provided, including: receiving a precoding matrix index from a UE; searching a precoding matrix corresponding to the precoding matrix index from a code book including a precoding matrix having an element zero corresponding to an antenna, so as to judge whether or not there is an element zero corresponding to the antenna in the precoding matrix; and judging whether or not there is an antenna or RRH that shall be deactivated for the UE according to a judgment result of the judging whether or not there is the element zero corresponding to the antenna in the precoding matrix.

According to another aspect of the present invention, a precoding matrix is provided, including an element zero corresponding to a predetermined antenna.

According to another aspect of the present invention, a code book for wireless communication is provided, including the precoding matrix having the element zero corresponding to the predetermined antenna.

According to another aspect of the present invention, a logic part readable program is provided, which when being executed by a logic part, enables the logic part to implement the method of the present invention, or enables the logic part to be used as the precoding matrix selection unit or the report unit of the present invention, or enables the logic part to be used as the element zero judgment unit or the antenna or RRH deactivation judgment unit of the present invention.

According to another aspect of the present invention, a logic part readable tangible storage medium is provided to store the above logic part readable program.

According to the technical solutions of the present invention, the RRH can be selected to improve the system performance.

BRIEF DESCRIPTION OF THE DRAWINGS

The above and other objects, characteristics and advantages of the present invention will be understood more easily through the following descriptions of the present invention which are made with reference to the drawings. The parts in the drawings are not drafted in proportion, but just for illustrating the principle of the present invention. For the convenience of illustrating and describing some portions of the present invention, corresponding portions in the drawings may enlarged, i.e., being enlarged in relation to other portions in an exemplary device practically manufactured according to the present invention. In the drawings, the same or corresponding technical features or parts will be denoted with the same or corresponding reference signs.

DESCRIPTION OF THE EMBODIMENTS

Figure 1:
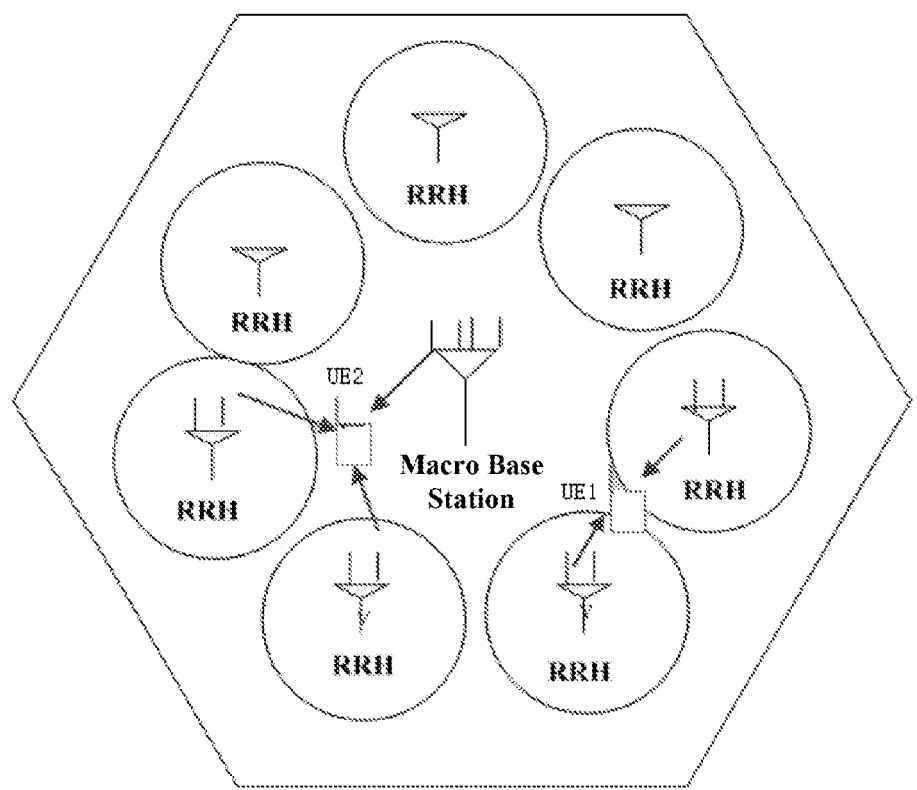
FIG. 1 illustrates a schematic diagram of the distribution of a base station and RRHs in a communication system.

The embodiments of the present invention will be described as follows with reference to the drawings. Elements and features described in one drawing or one embodiment of the present invention may be combined with elements and features illustrated in one or more other drawings or embodiments. To be noted, for the purpose of clearness, representations and descriptions of parts and processing unrelated to the present invention and known to a person skilled in the art are omitted in the drawings and the Description.

The Description and the drawings specifically disclose the specific embodiments of the present invention, and designate the ways in which the principle of the present invention can be adopted. It shall be appreciated that the scope of the present invention is not limited thereto. The present invention includes many changes, amendments and equivalents within the scope of the spirit and clauses of the accompanied claims.

To be emphasized, the term "comprise/include/have" herein specifies the presence of feature, element, step or component, not excluding the presence or addition of one or more other features, elements, steps or components.

Figure 2:
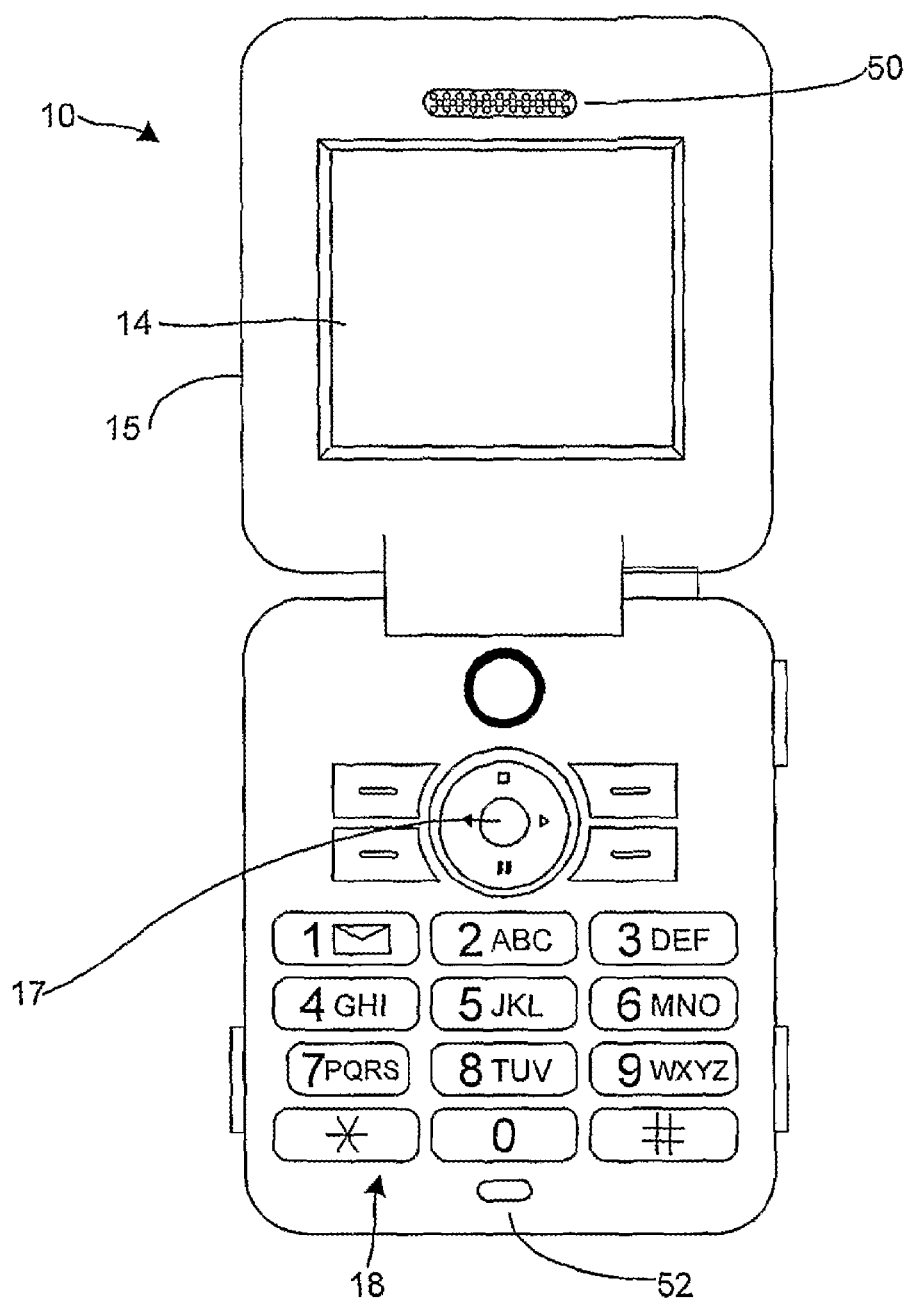
FIG. 2 illustrates a schematic diagram of a mobile phone used as an example of a UE according to an embodiment of the present invention.

FIG. 2 illustrates a schematic diagram of a mobile phone used as an example of a UE according to an embodiment of the present invention. As illustrated in FIG. 2, a mobile phone 10 may be a flip phone having a cover 15 movable between an open position and a closed position. In FIG. 2, the cover 15 is illustrated as being located at the open position. It shall be appreciated that the mobile phone 10 may be other structure such as a "bar phone" or a "slide phone".

The mobile phone 10 may include a display 14 that displays information such as operating state, time, telephone number, telephone directory, menus, etc. to the user, so that the user can utilize various features of the mobile phone 10. The display 14 may be further configured to visually display the content received by the mobile phone 10 and/or retrieved from a memory (not illustrated) of the mobile phone 10. The display 14 may be configured to present images, videos and other graphics (e.g., photos, mobile TV programs and game-related videos) to the user.

A keypad 18 provides multiple user input operations. For example, the keypad 18 may include alphanumeric keys that allow alphanumerical information (e.g., telephone number, telephone list, telephone directory, notepad, text, etc.) to be input. In addition, the keypad 18 may include specific function keys 17, such as a "call send" key for initiating or answering a phone call, and a "call end" key for ending or hanging up the phone call. The specific function keys may further include a menu navigation key and a selection key which conveniently perform navigation through menus displayed on the display 14. For example, a pointing device and/or a navigation key may be provided to receive a directional input from the user. In addition, the display 14 and the keypad 18 may be used in combination to realize the soft key function. The electronic device 10 further includes parts essential for realizing its functions, such as antenna, microcontroller, speaker 50 and microphone 52.

Embodiment 1

Figure 3:
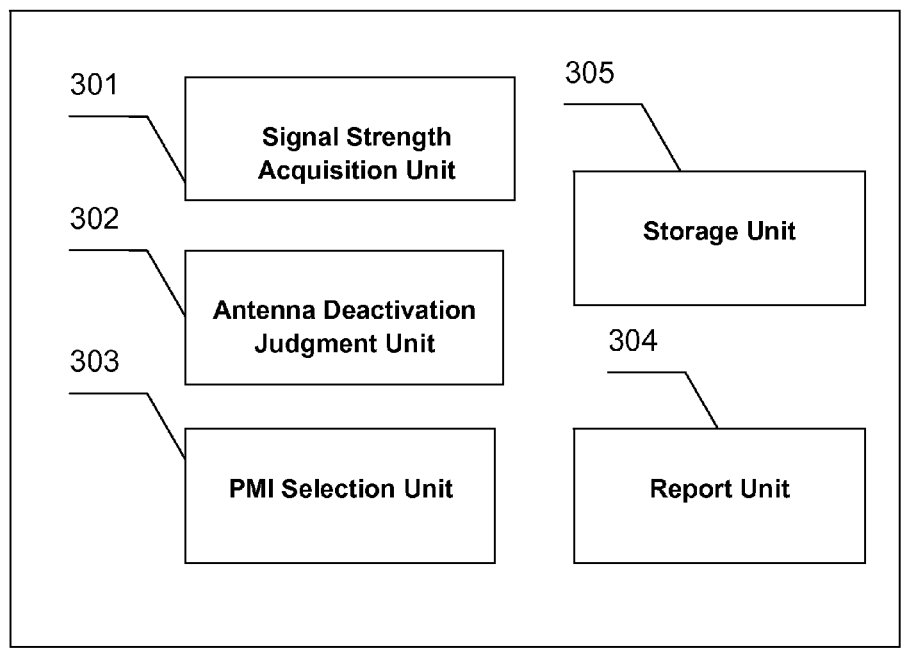
FIG. 3 schematically illustrates a block diagram of a UE according to Embodiment 1 of the present invention.

FIG. 3 schematically illustrates a block diagram of a UE according to Embodiment 1 of the present invention. As illustrated in FIG. 3, the UE according to Embodiment 1 of the present invention includes a signal strength acquisition unit 301, an antenna deactivation judgment unit 302, a Precoding Matrix Index (PMI) selection unit 303, a report unit 304 and a storage unit 305.

The signal strength acquisition unit 301 acquires the strengths of signals from antennas indicated by the base station through a measurement, or through an acquisition from other unit of the UE, etc.

Like the conventional technique, the UE of the present invention determines the antenna to be measured according to the instruction from the base station. For example in FIG. 1, UE1 at the right side measures the signals transmitted by the antennas of two RRHs, while UE2 at the left side measures the signals from the antennas of two RRHs and the signal from the antenna of the base station.

The signal strength for example may be a signal power or a signal amplitude.

The antenna deactivation judgment unit 302 judges whether or not to deactivate an antenna. Next, the condition that UE1 at the right side in FIG. 1 measures the signal strengths of four antennas of two RRHs will be described as an example. But it is applicable to the condition of measuring more or less antennas and more RRHs.

Figure 4:
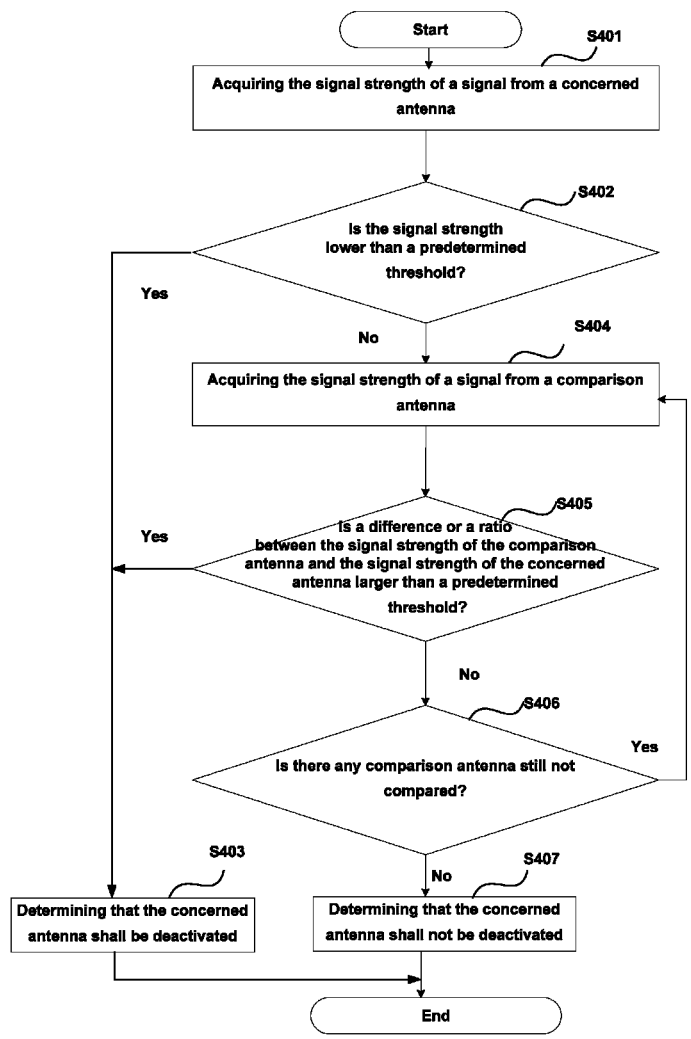
FIG. 4 schematically illustrates a flowchart of a method for judging whether or not to deactivate an antenna.

FIG. 4 schematically illustrates a flowchart of a method for judging whether or not to deactivate an antenna.

As illustrated in FIG. 4, firstly in step S401, the signal strength acquisition unit 301 acquires the signal strength of a certain antenna (i.e., concerned antenna) for example through a measurement. Next in step S402, it is judged whether the signal strength is lower than a predetermined threshold. If the signal strength is lower than the predetermined threshold (step S402, Yes), the flow enters step S403 to determine that the antenna shall be deactivated for the UE (hereinafter referred to as "the antenna shall be deactivated" for the convenience of description), and then ends the processing. If the signal strength is larger than the predetermined threshold (step S402, No), the flow enters step S404 to acquire the signal strength of an antenna (i.e., comparison antenna) not compared with the antenna. Next in step S405, it is judged whether a difference or a ratio between the signal strength of the comparison antenna and the signal strength of the concerned antenna is larger than a predetermined threshold. If the difference or the ratio is larger than the predetermined threshold (step S405, Yes), it means that the signal strength of the concerned antenna is lower, thus the flow enters step S403 to determine that the antenna shall be deactivated, and then ends the processing. On the other hand, if the difference or the ratio is not larger than the predetermined threshold (step S405, No), the flow enters step S406 to judge whether there is any comparison antenna still not compared. If there is a comparison antenna still not compared (S406, Yes), the flow returns to step S404 to acquire the signal strength of the comparison antenna not compared with the antenna, and performs the processing following the step. If there is no comparison antenna still not compared (S406, No), the flow enters step S407 to determine that the antenna shall not be deactivated for the UE, and then ends the processing.

Steps S404 and S401 in FIG. 4 can be realized in one step. It shall be appreciated that the description of FIG. 4 is just exemplary, rather than a limitation to the scope of the present invention.

Although the embodiment of FIG. 4 only illustrates the flow of judging whether or not to deactivate an antenna, a person skilled in the art shall conceive to judge whether or not to deactivate other antennas similarly according to the flowchart. In that case, the antenna having been judged to be deactivated may not be used as the comparison antenna.

To be noted, according to the embodiment of the present invention, the antenna deactivation judgment unit may stop processing once it is judged that a predetermined number of (e.g., just one) antenna that shall be deactivated are existed. In other embodiment, all the antennas may be judged.

The PMI selection unit 303 selects a PMI capable of indicating the antenna to be deactivated, according to a result of judgment by the antenna deactivation judgment unit. The report unit 304 reports the selected PMI to the base station.

In a case where the signal strengths of four antennas of two RRHs are measured, for example assuming that antennas of a first RRH are T1 and T2, antennas of a second RRH are T3 and T4, an element of a Precoding Matrix (PM) corresponding to antenna T1 is P1, an element of a PM corresponding to antenna T2 is P2, an element of a PM corresponding to antenna T3 is P3, and an element of a PM corresponding to antenna T4 is P4, then the selected PM has the following form:

$$P = \begin{bmatrix} P_1 \\ P_2 \\ P_3 \\ P_4 \end{bmatrix} \begin{matrix} \} \text{ RRH1} \\ \} \text{ RRH2} \end{matrix}$$

When it is judged that antennas T3 and T4 shall be deactivated, a PM having the following form may be selected:

$$P = \begin{bmatrix} P_1 \\ P_2 \\ 0 \\ 0 \end{bmatrix}$$

That is, in one aspect of the present invention, the antenna to be deactivated is indicated by setting corresponding precoding matrix element as zero.

Thus, one aspect of the present invention relates to the precoding matrix having an element zero corresponding to a predetermined antenna. Further, the present invention also relates to a code book including the precoding matrix which has the element zero corresponding to the predetermined antenna.

The code book of the present invention shall be understood generally. In one embodiment, the code book only includes one stage of precoding matrixes (which are usable precoding matrixes). In another embodiment, the code book includes two or more sets of matrixes (one set of matrixes is referred to as one stage), and the precoding matrixes are obtained by multiplying matrixes of different sets of matrixes (also referred to as "multiplying respective stages of matrixes"). In that case, PMIs of the precoding matrixes are constructed by the serial numbers of respective stages (sets) of matrixes from which the precoding matrixes are obtained. When the precoding matrixes obtained by multiplying respective stages of matrixes include the precoding matrix having the element zero corresponding to the antenna, it means that the code book includes the precoding matrix having the element zero corresponding to the antenna. Thus, the above two forms of code books both may include the precoding matrix having the element zero corresponding to the antenna, and they both may be described as having the precoding matrix.

In a case where the code book includes two or more stages of matrixes, one stage of matrixes may be existing constant modulus code book matrixes (i.e., each element in the matrix is a complex number having a module value 1), while other stages of matrixes are transformation matrixes, which may be pre-multiplication or post-multiplication matrixes, and which may adopt point multiplication or Kronecker products. Assuming that the code book includes two stages of matrixes (e.g., pre-multiplication matrixes), a set of matrixes W1 belong to a first stage, and a set of matrixes W2 belong to a second stage, then for the 4-antenna code book in the LTE system, the following matrix w1 of W1 and matrix w2 of W2 are existed in the code book including the precoding matrix having the element zero corresponding to the antenna according to the embodiment of the present invention:

$$P = w1*w2 = \begin{bmatrix} P_1 \\ P_2 \\ 0 \\ 0 \end{bmatrix}.$$

Of course, w1 meeting equation (1) may be a non-constant modulus code book, such as $$W1 = \begin{bmatrix} 1 & 0 & 0 & 0 \\ 0 & 1 & 0 & 0 \\ 0 & 0 & 0 & 0 \\ 0 & 0 & 0 & 0 \end{bmatrix},$$

and the user shall feed back the index number (PMI value) of the precoding matrix including w1 and w2.

In a case where the non-constant modulus code book is adopted, in one embodiment, w1 may be used as an indication of antenna or RRH selection. The base station acquires the result of antenna or RRH selection by the user, by obtaining w1.

In Embodiment 1 of the present invention, the code book may be divided into a first code book and a second code book according to the fact whether or not the precoding matrix has the element zero corresponding to the antenna. The first code book only includes a precoding matrix having no element zero corresponding to the antenna. The second code book only includes a precoding matrix having an element zero corresponding to an antenna.

The code book (including the first and second code book) is stored in the storage unit 305. The same code book shall be stored in the base station and the UE. The second code book may be divided into a 4-antenna second code book for the 4 antennas, a 6-antenna second code book for the 6 antennas, etc.

When the antenna deactivation judgment unit 302 judges that there exists the antenna that shall be deactivated or a predetermined number of antennas that shall be deactivated, the PMI selection unit 303 only selects a precoding matrix from the second code book. The report unit 304 transmits the index of the precoding matrix selected by the PMI selection unit 303.

Embodiment 2

In Embodiment 1 according to the present invention, it is possible that only a part of antennas of the same RRH are deactivated (e.g., only antenna P1 of RRH1 is deactivated), and this usually makes little sense. Therefore, in Embodiment 2 according to the present invention, in order to avoid the above situation, among precoding matrixes of a code book, the elements of the same precoding matrix for antennas of the same RRH shall be all zero or non-zero, so as to avoid a precoding matrix such as [P1, 0, P3, 0].

Embodiment 3

In addition, an RRH deactivation judgment unit may be added to Embodiment 2 to perform a judgment for an RRH. For example, it is judged that an RRH shall be deactivated only when all antennas of the RRH are to be deactivated. Or, it is judged that an RRH shall be deactivated when a predetermined proportion of antennas among those of the RRH are to be deactivated. The PMI selection unit 303 will not select a precoding matrix from the second code book unless the RRH deactivation judgment unit judges that there exists an RRH that shall be deactivated.

Embodiment 4

In the above embodiment, the UE performs a measurement of signal strength, and specially judges whether there is any antenna that shall be deactivated, and if yes, selects a precoding matrix from a particular code book (the second code book). But in other embodiment, the code book may not be classified, and all the precoding matrixes may be used for a selection of the PMI. According to such embodiment, the processing burden of the UE can be reduced, and the change to the UE is minimized. In addition, since the code book includes a precoding matrix having an element zero corresponding to an antenna, the purpose of RRH selection still can be achieved.

Figure 5:
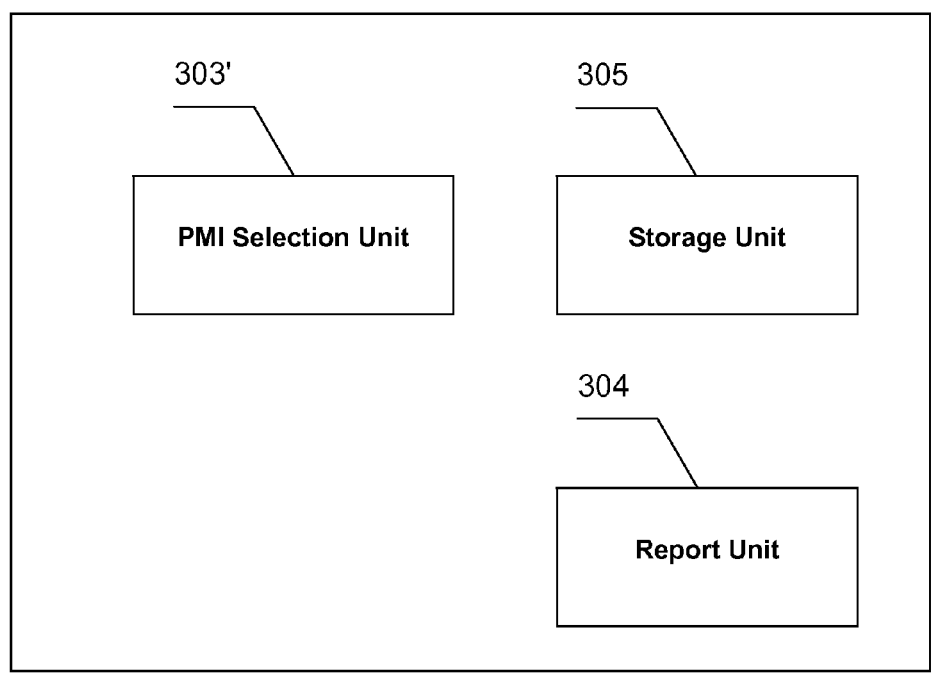
FIG. 5 illustrates a schematic functional block diagram of a UE according to an embodiment of the present invention.

FIG. 5 illustrates a schematic functional block diagram of a UE according to Embodiment 4 of the present invention.

As illustrated in FIG. 5, the UE according to Embodiment 4 of the present invention differs from the UE as illustrated in FIG. 3 in that the signal strength acquisition unit 301 and the antenna deactivation judgment unit 302 are omitted, and being different from the PMI selection unit 303 as illustrated in FIG. 3, the PMI selection unit 303 for the UE according to Embodiment 4 of the present invention directly selects a PMI according to a performance indicator and channel parameters for PMI selection. To be noted, the channel parameters (such as channel response) for PMI selection, based on which the PMI is selected, need to be measured, but the measurement of those parameters is not so closely related to the present invention, and herein is omitted.

In this embodiment of the present invention, the PMI is selected from the code book including the precoding matrix having the element zero corresponding to the antenna, thus when there is the antenna that shall be deactivated, the precoding matrix having the element zero corresponding to the antenna will be selected, thereby still achieving the purpose of selecting an RRH.

Similarly, in one embodiment and in the same precoding matrix, elements of the same precoding matrix for antennas of the same RRH are all zero or non-zero.

Figure 6:
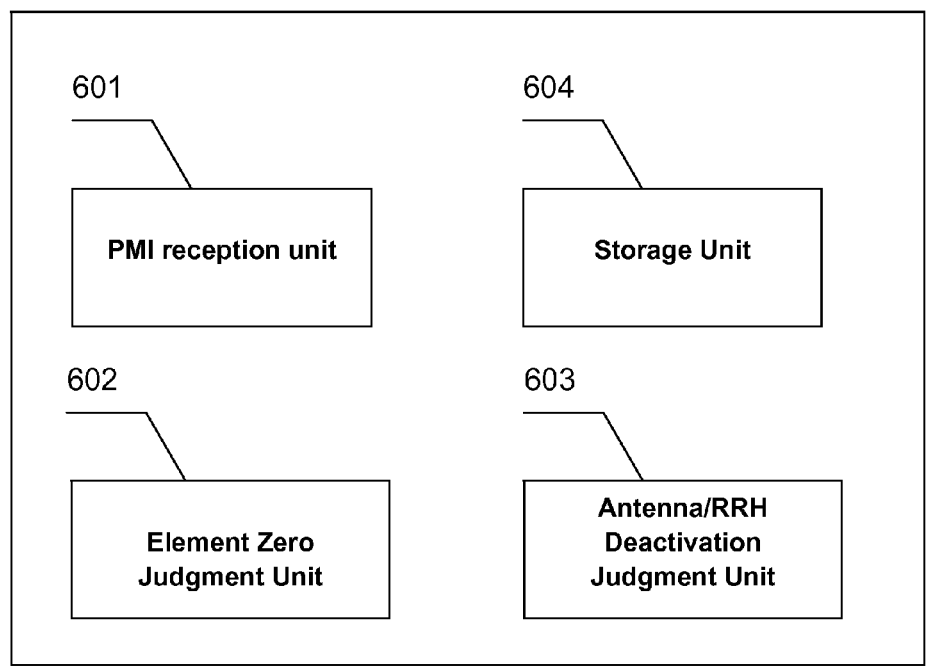
FIG. 6 illustrates a schematic functional block diagram of a base station according to an embodiment of the present invention.

FIG. 6 illustrates a schematic functional block diagram of a base station according to an embodiment of the present invention. As illustrated in FIG. 6, according to an embodiment of the present invention, the base station includes a PMI reception unit 601, an element zero judgment unit 602, an antenna/RRH deactivation judgment unit 603 and a storage unit 604.

The storage unit 604 stores the same code book as that stored in the UE. In one embodiment, the code book includes a precoding matrix having an element zero corresponding to an antenna. In a further embodiment and in the same precoding matrix, elements of the same precoding matrix for antennas of same RRH are all zero or non-zero.

However, for the code book stored in the base station, it is unnecessary to classify the precoding matrixes in the code book, i.e., it is unnecessary to divide the code book into a first code book and a second code book. Of course, the code book may also be divided into the first code book and the second code book when necessary. The PMI reception unit 601 receives a PMI from the UE directly or through an RRH. The element zero judgment unit 602 searches the code book stored in the storage unit 604 for corresponding precoding matrix according to the received PMI, and determines whether the searched precoding matrix includes an element zero corresponding to an antenna. Next, the antenna/RRH deactivation judgment unit 603 judges whether or not to deactivate corresponding antenna or RRH for the UE transmitting the PMI. That is, the PMI transmitted from the user terminal shall be considered to determine whether or not to deactivate corresponding antenna or RRH for the UE transmitting the PMI. In one embodiment, when it is determined that the searched precoding matrix includes the element zero corresponding to the antenna, corresponding antenna or RRH is deactivated for the UE. In an optional embodiment, other factors may also be considered to determine whether or not to deactivate corresponding antenna for the UE, while the fact whether or not the precoding matrix includes the element zero corresponding to the antenna shall be considered.

Figure 7:
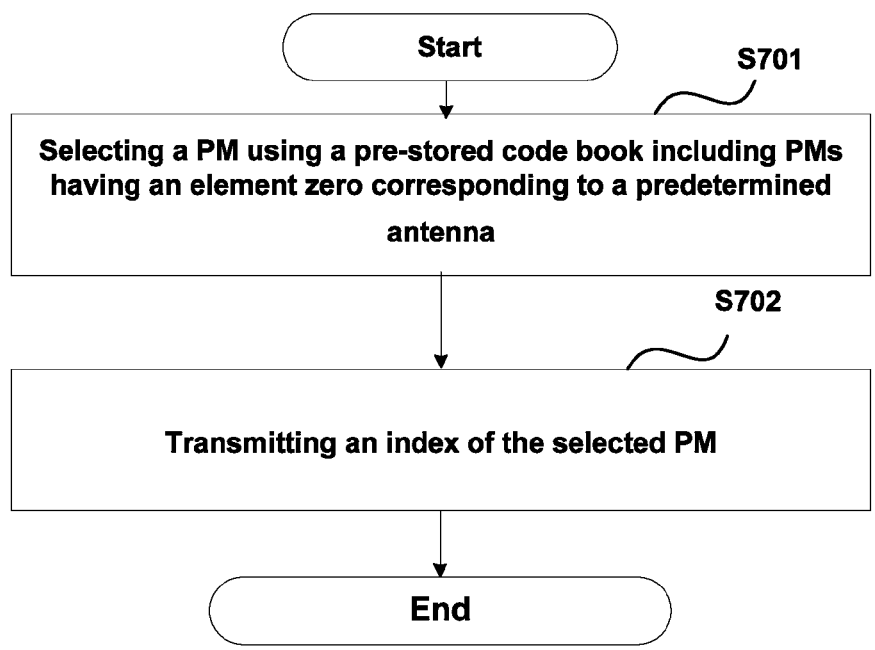
FIG. 7 illustrates a method for selecting an RRH according to an embodiment of the present invention.

FIG. 7 illustrates a method for selecting an RRH according to an embodiment of the present invention. As illustrated in FIG. 7, the method for selecting an RRH according to an embodiment of the present invention firstly in step S701, determines a precoding matrix to be used according to performance indicator (e.g., maximizing the throughput or minimizing the bit error rate) and channel parameters by using a pre-stored code book. In this step, the used code book includes a precoding matrix having an element zero corresponding to the antenna. In a further embodiment and in the same precoding matrix, elements of the same precoding matrix for antennas of the same RRH are all zero or non-zero. Next, in step S702, an index of the precoding matrix (PMI) indicating the selected precoding matrix is transmitted.

Figure 8:
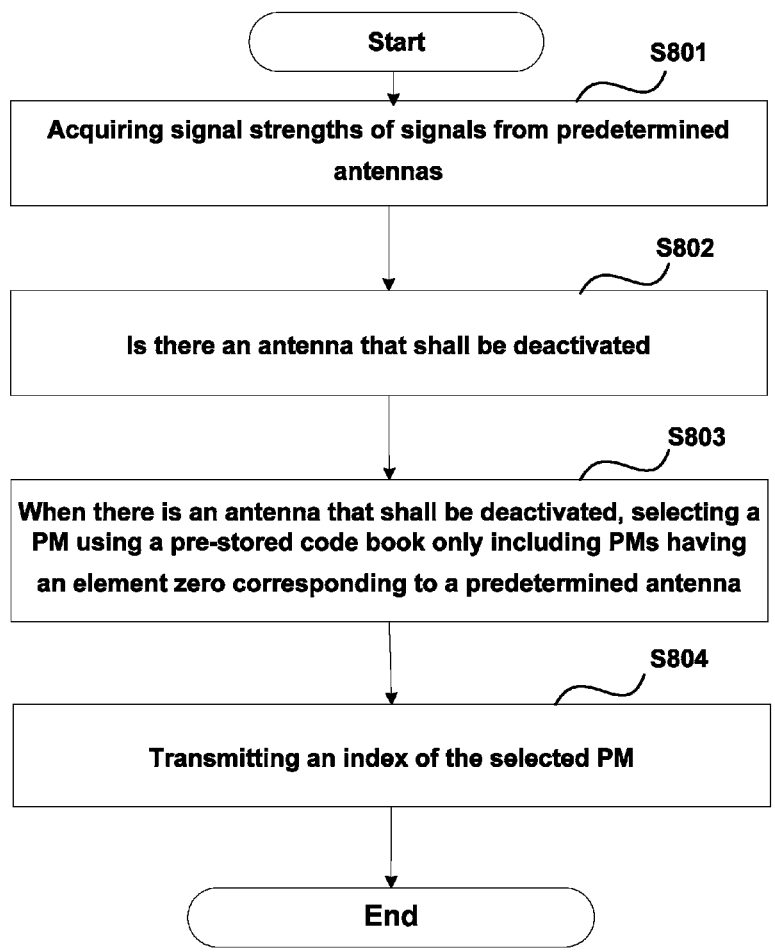
FIG. 8 illustrates a method for selecting an RRH according to another embodiment of the present invention.

FIG. 8 illustrates a method for selecting an RRH according to another embodiment of the present invention. As illustrated in FIG. 8, firstly in step S801, acquiring the strengths of the signals from predetermined antennas through a measurement, etc. Next in step S802, judging whether or not there is an antenna that shall be deactivated. When it is judged in step S802 that there is an antenna that shall be deactivated, in step S803 selecting a precoding matrix from precoding matrixes only including precoding matrix elements having an element zero corresponding to the antenna. Next in step S804, transmitting an index of the precoding matrix selected in step S803.

Figure 9:
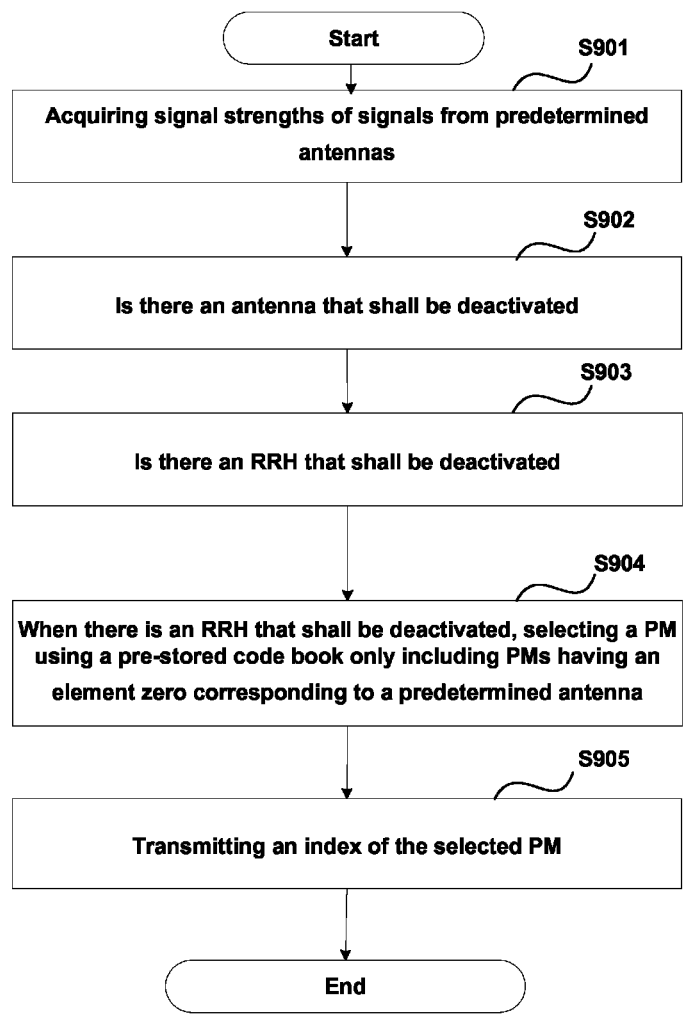
FIG. 9 illustrates a method for selecting an RRH according to still another embodiment of the present invention.

FIG. 9 illustrates a method for selecting an RRH according to still another embodiment of the present invention. As illustrated in FIG. 9, firstly in step S901, acquiring signal strengths of antennas through a measurement, etc. Next in step S902, judging whether or not there is an antenna that shall be deactivated, and in step S903, judging whether or not there is an RRH that shall be deactivated according to a result of the judgment in step S902. When it is judged in step S903 that there is an RRH that shall be deactivated, in step S904 selecting a precoding matrix from precoding matrixes only including precoding matrix elements having an element zero corresponding to the antenna. Next in step S905, transmitting an index of the precoding matrix selected in step S904.

In addition, in one embodiment and in the same precoding matrix, elements of the same precoding matrix for antennas of the same RRH are all zero or non-zero.

The methods illustrated in FIGS. 8 and 9 may be deemed as embodiments of the method illustrated in FIG. 7. The methods illustrated in FIGS. 7 to 9 are all used at the UE.

Figure 10:
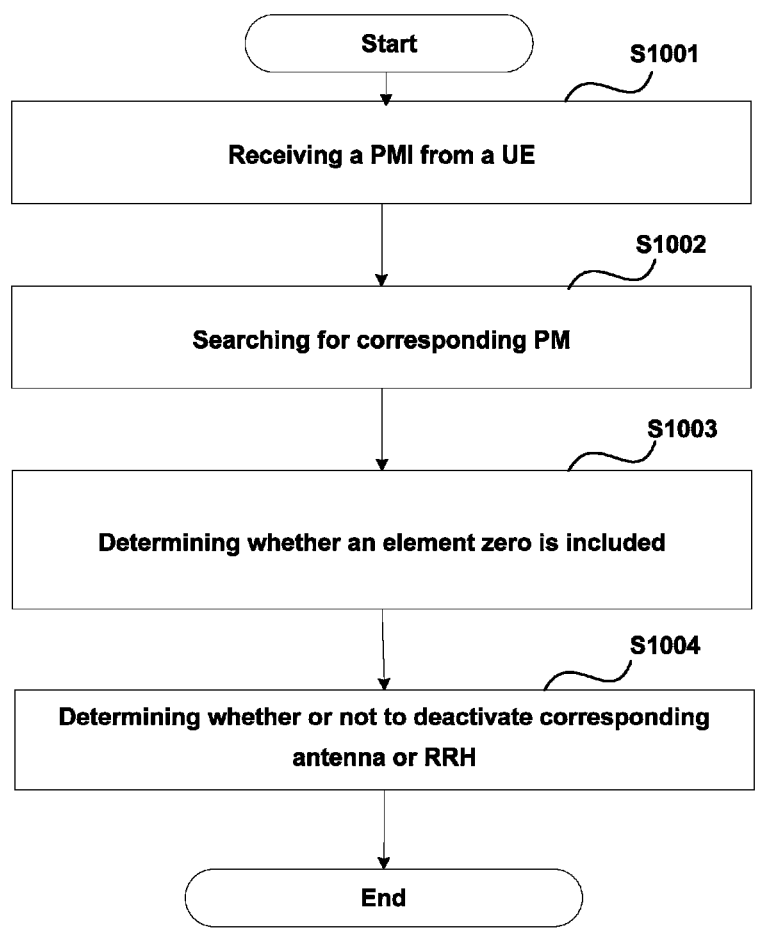
FIG. 10 illustrates a method for selecting an RRH according to yet another embodiment of the present invention.

FIG. 10 illustrates a method for selecting an RRH according to yet another embodiment of the present invention. As illustrated in FIG. 10, firstly, in step S1001 receiving a PMI from a UE. Next, in step S1002 searching a code book for corresponding precoding matrix according to the PMI. To be noted, the code book includes precoding matrixes including precoding matrix elements having an element zero corresponding to an antenna, and precoding matrixes not including precoding matrix elements having an element zero corresponding to an antenna. Next, in step S1003, judging whether or not the searched precoding matrix has an element zero corresponding to an antenna. Finally, in step S1004 judging whether or not to deactivate a certain antenna or RRH for the UE.

In the present invention, deactivating an antenna or RRH for the UE means making the antenna or RRH do not transmit information for a certain UE, usually rather than turning off it physically, such as shutting off a power supply or a switch.

In the descriptions of the embodiments of the present invention, the descriptions of methods and steps may promote the understanding of devices and units, while the descriptions of devices and units may promote the understanding of methods and steps.

The above devices and methods of the present invention may be implemented through hardware or a combination of hardware and software. The present invention relates to a logic part readable program which when being executed by a logic part, enables the logic part to implement the aforementioned devices or constituent parts, or enables the logic part to implement the aforementioned methods or steps. The logic part for example may be a field programmable logic part, a microprocessor, a processor used in the computer, etc. The present invention further relates to a storage medium for storing the above program, such as hard disc, magnetic disc, optical disc, DVD, flash, magnetic optical disc, memory card, memory stick, etc.

Herein features described and/or illustrated with respect to one embodiment may be used in the same or similar way in one or more other embodiments, combined with or in substitution of the features in other embodiments The present invention is described as above in conjunction with specific embodiments. But a person skilled in the art shall appreciate that those descriptions are just exemplary, rather than limitations to the protection scope of the present invention. A person skilled in the art can make various modifications and changes to the present invention based on the spirit and the principle of the present invention, and those modifications and changes also fall within the scope of the present invention.

What is claimed is:

1. A User Equipment (UE), comprising:
   a storage unit, configured to store a code book comprising a plurality of precoding matrixes which contain one or more precoding matrix(es) having one or more zero element(s) corresponding to one or more antenna(s) that should be deactivated;
   a precoding matrix selection unit, configured to select one of the plurality of precoding matrixes from the code book stored in the storage unit;
   a report unit, configured to report an index of the one of the plurality of precoding matrixes selected by the precoding matrix selection unit;
   a signal strength acquisition unit, configured to acquire signal strengths of signals from respective antennas serving the UE; and
   an antenna deactivation judgment unit, configured to judge whether or not an antenna shall be deactivated for the UE according to the signal strengths acquired by the signal strength acquisition unit,
   wherein the precoding matrix selection unit selects the one of the plurality of precoding matrixes from the one or more precoding matrix(es) having one or more zero element(s) corresponding to the one or more antenna(s) that should be deactivated, when the antenna deactivation judgment unit judges that the antenna shall be deactivated for the UE.

2. The UE according to claim 1, wherein transmitting signals to the antennas are provided by one or more transmission point(s), the UE further comprising:
   a transmission point deactivation judgment unit, configured to judge whether or not there is one or more transmission point(s) that shall be deactivated for the UE according to a judgment result of the antenna deactivation judgment unit,
wherein, the precoding matrix selection unit selects the precoding matrix to be used from a set of precoding matrixes having one or more zero element(s) corresponding to one or more antenna(s) that should be deactivated in the code book, when the transmission point deactivation judgment unit judges that there is a transmission point that shall be deactivated for the UE.

3. The UE according to claim 1, wherein elements in a same precoding matrix, elements for antennas of same transmission point are all zero, or elements for antennas of same transmission point are all non-zero.

4. The UE according to claim 1, wherein the code book comprises two or more sets of matrixes, in which matrixes of different sets of matrixes are multiplied to obtain the precoding matrix,
indexes of the matrixes in the sets of matrixes obtaining the precoding matrix constitute the index of the precoding matrix.

5. A base station, comprising:
a storage unit, configured to store a code book comprising a plurality of precoding matrixes which contain one or more precoding matrix(es) having one or more zero elements(s) corresponding to one or more antenna(s) or transmission point(s) that should be deactivated;
a precoding matrix index reception unit, configured to receive a precoding matrix index from a UE;
a zero element judgment unit, configured to search one of the plurality of precoding matrixes corresponding to the precoding matrix index from the code book, so as to judge whether or not there is one or more zero element(s) corresponding to an antenna or a transmission point in the precoding matrix; and
an antenna or transmission point deactivation judgment unit, configured to judge whether or not the antenna or the transmission point shall be deactivated for the UE according to a judgment result of the zero element judgment unit,
wherein the zero element corresponds to the antenna or the transmission point to be deactivated.

6. A method for selecting a transmission point for a UE, comprising:
selecting one of a plurality of precoding matrixes from a code book stored in a storage unit, the code book comprising the plurality of precoding matrixes which contain one or more precoding matrix(es) having one or more zero element(s) corresponding to one or more antenna(s) that should be deactivated;
reporting an index of the precoding matrix selected;
acquiring signal strengths of signals from respective antennas serving the UE; and
judging whether or not an antenna shall be deactivated for the UE according to the signal strengths acquired,
wherein the one of the plurality of precoding matrixes is selected from the one or more precoding matrix(es) having one or more zero element(s) corresponding to the one or more antenna(s) should be deactivated, when it is judged that the antenna shall be deactivated for the UE.

7. The method according to claim 6, wherein transmitting signals to the antennas are provided by one or more transmission point(s), the method further comprising:
judging whether or not there is a transmission point that shall be deactivated for the UE according to a judgment result of the judging whether or not there is one or more antenna(s) that shall be deactivated for the UE,
wherein, the precoding matrix to be used is selected from a set of precoding matrixes having one or more zero element(s) corresponding to one or more antenna(s) that should be deactivated in the code book, when it is judged that there is a transmission point that shall be deactivated for the UE.

8. The method according to claim 6, wherein in a same precoding matrix, elements for antennas of same transmission point are all zero, or elements for antennas of same transmission point are all non-zero.

9. The method according to claim 6, wherein the code book comprises two or more sets of matrixes, in which matrixes from different sets of matrixes are multiplied to obtain the precoding matrix,
indexes of the matrixes in the sets of matrixes obtaining the precoding matrix constitute the index of the precoding matrix.

10. A method for selecting a transmission point for a base station, comprising:
receiving a precoding matrix index from a UE;
searching one of the plurality of precoding matrixes corresponding to the precoding matrix index from a code book comprising the plurality of precoding matrixes which contain one or more precoding matrix(es) having one or more zero element(s) corresponding to one or more antenna(s) that should be deactivated, so as to judge whether or not there is one or more zero one or more zero element(s) corresponding to an antenna or a transmission point in the precoding matrix; and
judging whether or not one or more antenna(s) or transmission point(s) shall be deactivated for the UE according to a judgment result of the judging whether or not there is one or more zero element(s) corresponding to the antenna or the transmission point that should be deactivated in the one of the plurality of precoding matrixes,
wherein the zero element(s) corresponds to the antenna or the transmission point to be deactivated.

* * * * *